Feb. 17, 1953 B. H. SLATTER ET AL 2,628,684
CONTROL FOR CONSTANT-SPEED, VARIABLE-PITCH PROPELLERS
Filed Oct. 1, 1947 5 Sheets-Sheet 1
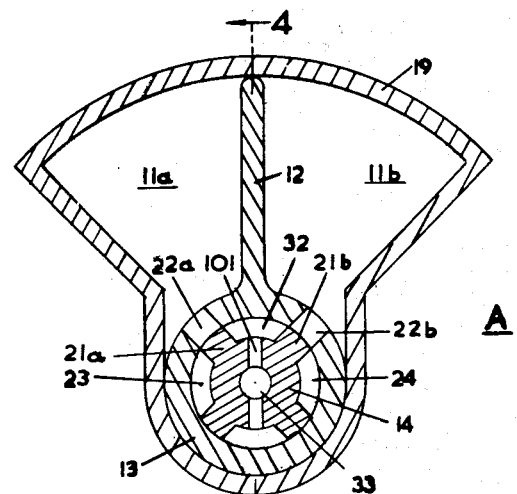
FIG. 1.
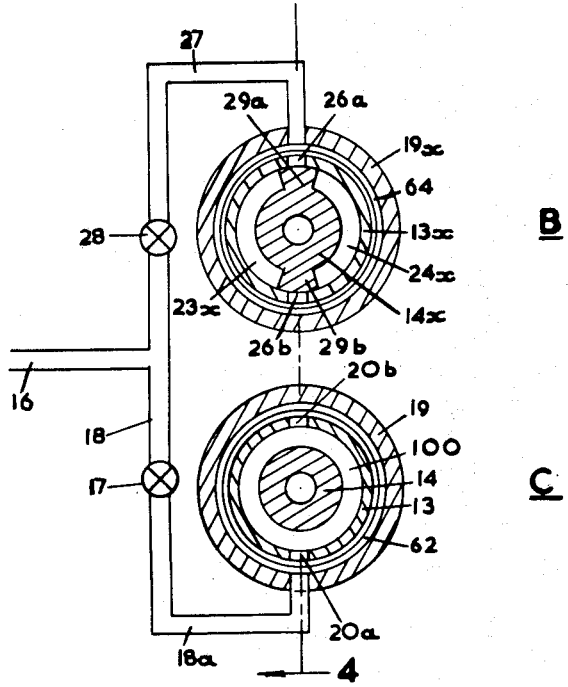
INVENTORS
B. H. SLATTER &
T. G. DAISH
ATTYS.

Feb. 17, 1953 — B. H. SLATTER ET AL — 2,628,684
CONTROL FOR CONSTANT-SPEED, VARIABLE-PITCH PROPELLERS
Filed Oct. 1, 1947 — 5 Sheets-Sheet 3

INVENTORS
B. H. SLATTER &
T. G. DAISH
BY Mawhinney & Mawhinney
ATTYS.

Feb. 17, 1953 B. H. SLATTER ET AL 2,628,684
CONTROL FOR CONSTANT-SPEED, VARIABLE-PITCH PROPELLERS
Filed Oct. 1, 1947 5 Sheets-Sheet 5

INVENTORS
B. H. SLATTER &
T. G. DAISH
BY Mawhinney & Mawhinney
ATTYS.

Patented Feb. 17, 1953

2,628,684

UNITED STATES PATENT OFFICE 2,628,684

CONTROL FOR CONSTANT-SPEED, VARIABLE-PITCH PROPELLERS

Brian H. Slatter and Thomas G. Daish, Coventry, England, assignors to Armstrong Siddeley Motors Limited, Coventry, England Application October 1, 1947, Serial No. 777,262
In Great Britain June 21, 1947

5 Claims. (Cl. 170—135.74)

In instances where a constant-speed, variable-pitch propeller of an aircraft, is to be driven by an internal-combustion turbine unit, the movement of the control element of the constant-speed mechanism (to vary the datum setting of the constant-speed mechanism) may be directly effected by movement of the pilot's throttle control which also adjusts the fuel supply. This arrangement, however, has the disadvantage that when the throttle control is moved to increase the fuel supply the unit speeds up, under low load, to above the selected speed before the constant-speed mechanism (which is responsive to the speed of the unit) can correspondingly coarsen the pitch of the air-screw for developing the requisite power, with the result that relatively violent fluctuations occur in the speed and power of the unit before the latter settles down to operate at the selected speed.

By "increasing" the datum setting of the constant-speed mechanism we mean adjusting it so that the unit will run faster, and by "decreasing" the said setting the reverse is meant.

Our main object is to provide means whereby the unit can be rapidly accelerated to the selected speed and power with a minimum of hunting (i. e., variations above and below the selected speed).

According to the invention, a constant-speed, variable-pitch propeller, which is to be driven by an internal-combustion turbine unit, has the movable control element of the constant-speed mechanism connected to the throttle control of the unit through a hydraulic time-delay device such that, when the throttle control is moved to increase the fuel supply to the unit, the datum setting of the constant-speed mechanism is initially increased at a relatively-low rate, then at a relatively-high rate, and finally at a relatively-low rate, so as to enable the unit rapidly to assume the selected speed and power without undesirable fluctuations.

In the accompanying drawings:

Figure 1 is a diagram illustrating a hydraulic time-delay device for effecting the control according to the invention, three coaxial portions of the valve means being shown one below the other for convenience and marked A, B and C for facilitating the showing of their respective positions in Figure 4;

Figure 4:
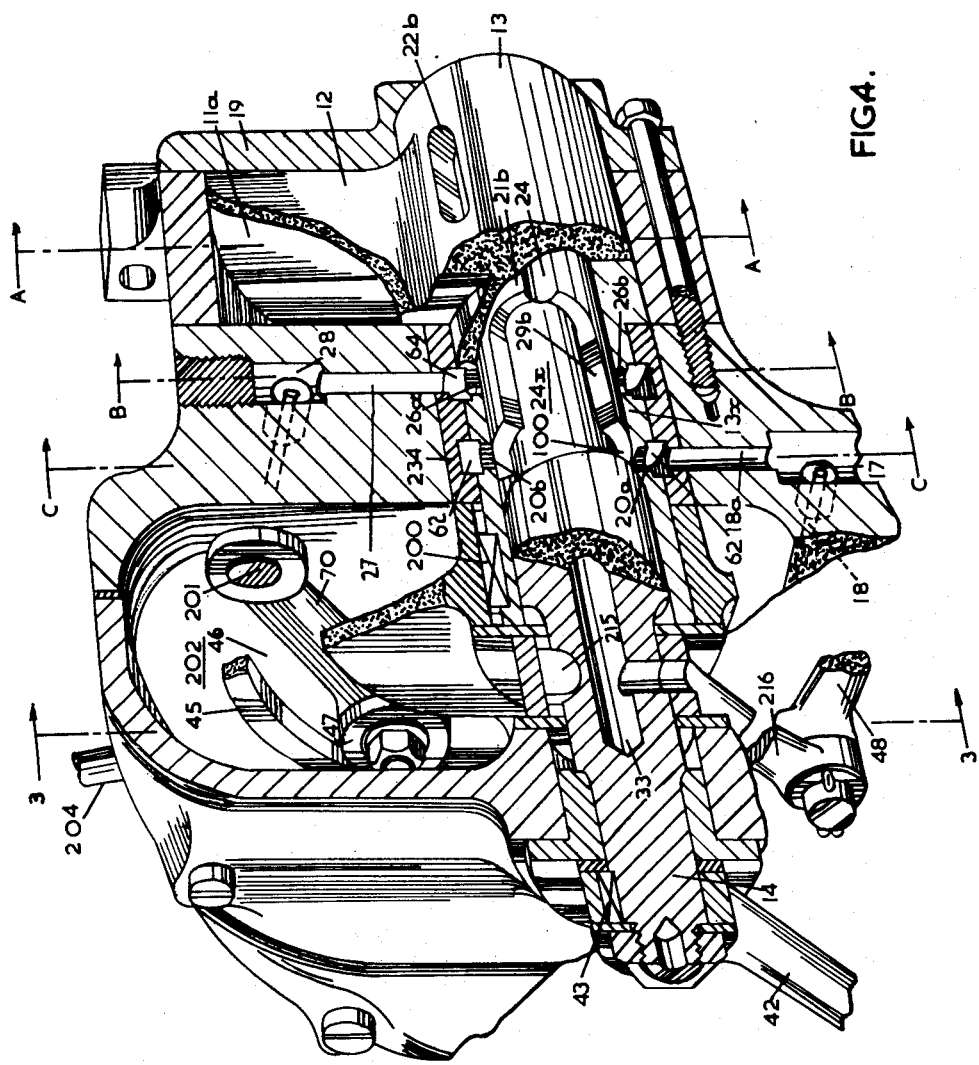
Figure 4 is a fragmentary, part-sectional view in perspective of the time-delay device.

In the drawings, and particularly in Figure 1 the hydraulic servomotor shown includes a working chamber which is divided into two compartments 11a, 11b by a vane 12 which is fast with a sleeve having two coaxial portions 13, 13x and rotatably supported on a rotary valve member having coaxial portions 14, 14x with which the throttle lever 60 (Figure 5) for the turbine unit is connected. (Although, in Figure 1, the sleeve and valve member are shown in three portions spaced one above another, that has been done purely for ease of illustration, those portions being, in fact, coaxial with one another and integral as shown by Figure 4.)

A supply pipe 16 for hydraulic fluid under pressure is connected by a pipe 18 (Figures 1 and 4) through a restrictor valve 17 (Figures 1 and 4) to a pipe 18a terminating in an annular passage 62, in the casing 19 or a liner 234 therein, from which ports 20a and 20b in the sleeve portion 13 are fed for supplying the pressure fluid to an annular groove 100 in the valve member as shown at C in Figure 1. This groove 100 communicates with valve chambers 23x and 24x (shown at B in Figure 1) defined between two lands 29a, 29b of the valve member portion 14x, which lands are in peripheral contact with the bore of the sleeve portion 13x. These valve chambers are extended axially to form narrower valve chambers 23 and 24 as shown at A in Figure 1.

The vane 12 is shown in an intermediate position in Figure 1, and, in this position, an initial rotation of the valve member portion 14 in the clockwise direction (for accelerating the turbine unit) causes the land 21a to uncover a port 22a in the sleeve and to admit the pressure fluid to the portion 11a of the working chamber, thus driving the vane in the clockwise sense (Figure 1). The portion 14 has four of these lands two of which define the valve chamber 23 for coaction with the port 22a for acceleration control, while two define the valve chamber 24 for coaction with the port 22b for deceleration control, the sleeve port 22b being provided for coaction with the land 21b.

The sleeve portion 13x (indicated at B in Figure 1) has a pair of ports 26a, 26b to which pressure fluid from the pipe 16 can respectively be delivered through a pipe 27 terminating in an annular passage 64 in the bore of the casing portion 19x (Figure 1) or liner 234 (Figure 4), a restrictor valve 28 being provided as necessary in the supply pipe 27.

The two diametrically-opposite lands 29a, 29b of the valve member portion 14x overlap the respective coacting ports 26a, 26b by a greater amount (say, 10° each side of the central position) than the ports 22a, 22b are overlapped by the lands 21a, 21b.

If the valve member is rotated relatively quickly and to a sufficient extent (for example, in a clockwise direction), then, after the aforesaid initial supply of fluid pressure to the chamber 11a to start the movement of the vane, the land 29a will have uncovered the port 26a, and a further supply of pressure fluid will then be delivered to the compartment 11a from the supply passage 27 by way of the groove 64, the port 26a, the valve chambers 23x, 23, and the port 22a, the resultant higher pressure in the compartment 11a then moving the vane at a greater speed than that at which it was initially moved.

Finally the port 26a catches up with and is closed by the land 29a to cut off the additional supply of motive fluid, and shortly afterwards the port 22a has caught up with and is closed by the land 21a, whereupon the vane 12 remains in its new position until the valve member 14, 14x is again turned.

During this clockwise movement of the vane the hydraulic fluid in the compartment 11b is exhausted through the port 22b into the space 32 and through a radial duct 101 of the portion 14 into a bore 33 thereof which is connected to the return side of the hydraulic circuit.

It will be seen that, on moving the throttle-control 60 to open the fuel valve (not shown) by the connection 66 as hereinafter described, the datum setting of the constant-speed mechanism 68, which is of known form, is adjusted in three phases as follows:

Firstly, the control element 67 of the constant-speed mechanism is adjusted relatively slowly to permit the turbine unit to speed to a value above that which corresponds to the datum setting of the constant-speed mechanism, this being done by the fluid entering the compartment 11a through the ports 20a and 22a, the resultant movement of the vane 12 and sleeve 13, 13x initiating the second phase;

Secondly, the control element 67 is adjusted at a much greater speed due to the extra supply of hydraulic fluid through the port 26a, spaces 23x and 23, and port 22a to the compartment 11a, the annular groove 64 permitting this supply after the port 26a has been moved clockwise out of alignment with the end of the pipe 27 by the movement of the sleeve portion 13x during the first phase; and Thirdly, the control element 67 is moved to complete the adjustment at the same lower speed as that during the first phase, the land 29a being caught by the port 26a and cutting off the additional fuel supply of the second phase.

Figure 2:
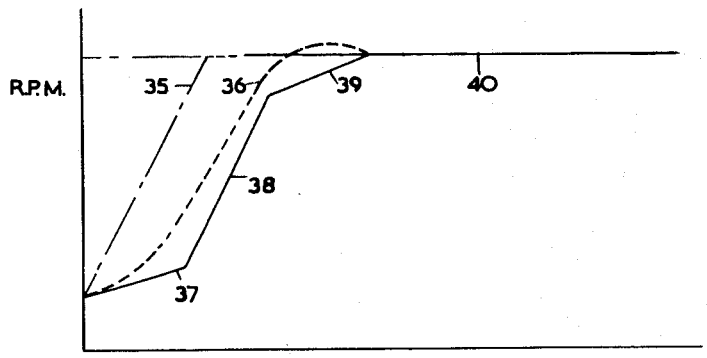
Figure 2 is a graph illustrating how the internal-combustion turbine unit can accelerate by reason of the adjustment, in stages, of the datum setting of the constant-speed mechanism through the control of the invention.

The effect is illustrated in Figure 2 in which the curve 35 indicates the rate of throttle lever movement (i. e., the rate of fuel delivery to the turbine unit), the curve 36 the speed of the unit, and the curve 37, 38, 39 the datum setting of the constant-speed mechanism 68. It will be seen that with a smooth throttle lever movement the increase in the datum setting of the constant-speed mechanism is initially caused to lag (curve-portion 37) so that the speed of the turbine unit can rise above the speed corresponding with the datum setting, the constant-speed mechanism then applies the load (as shown at 38), in step with the throttle lever movement, thus reducing the tendency of the unit to over-speed and, finally the remainder of the load is applied at a lower rate (curve-portion 39) so as to smooth out any tendency for the unit greatly to exceed, or fall below, the selected speed, which latter is indicated by the curve 40.

Figure 3:
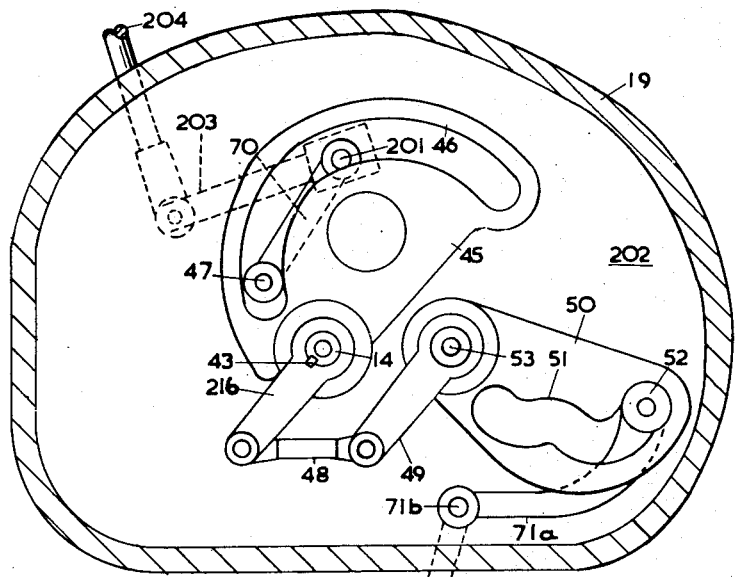
Figure 3 is a view, on the line 3—3 of Figure 4, of the control showing linkage actuated from the throttle control.
Figure 5:
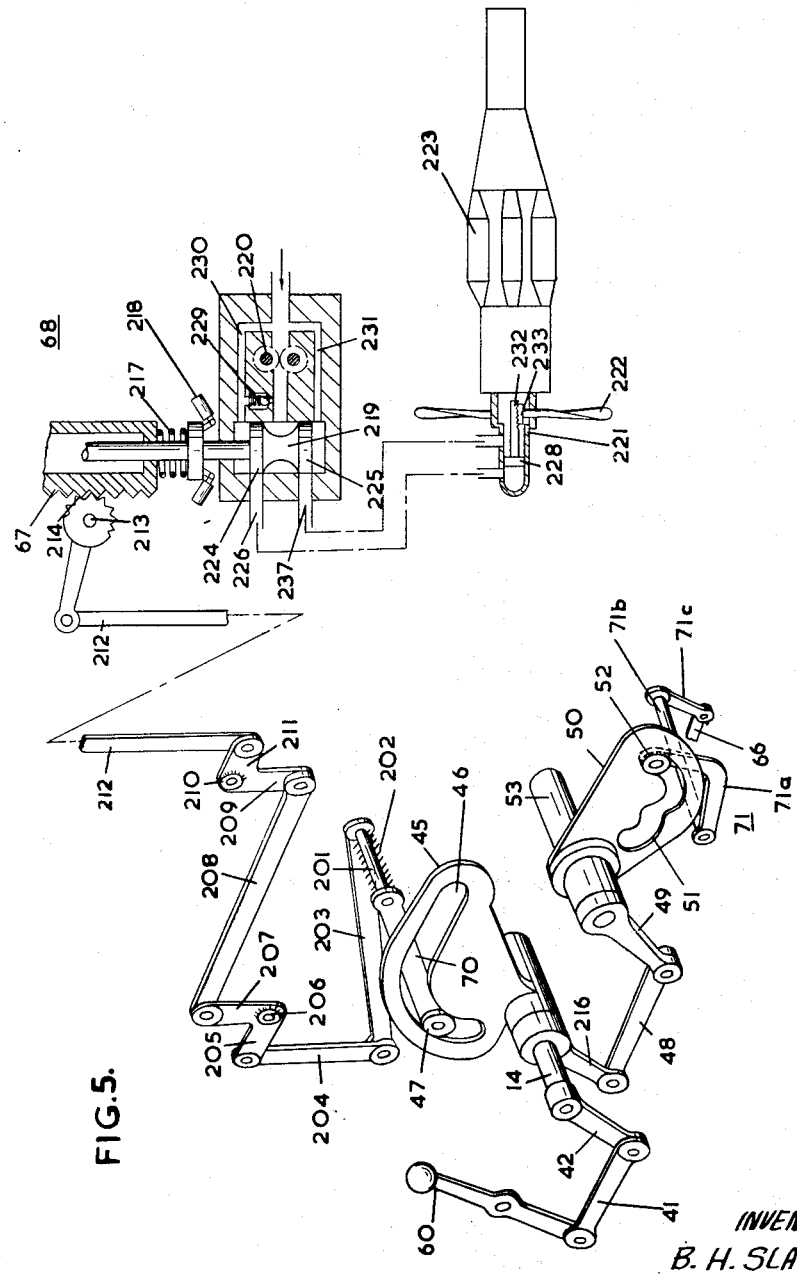
Figure 5 is a diagram of the actuating means of the variable-pitch propeller, the constant-speed mechanism therefor (these two being shown in section) and of the connection from the time-delay mechanism shown in perspective.
Figure 6:
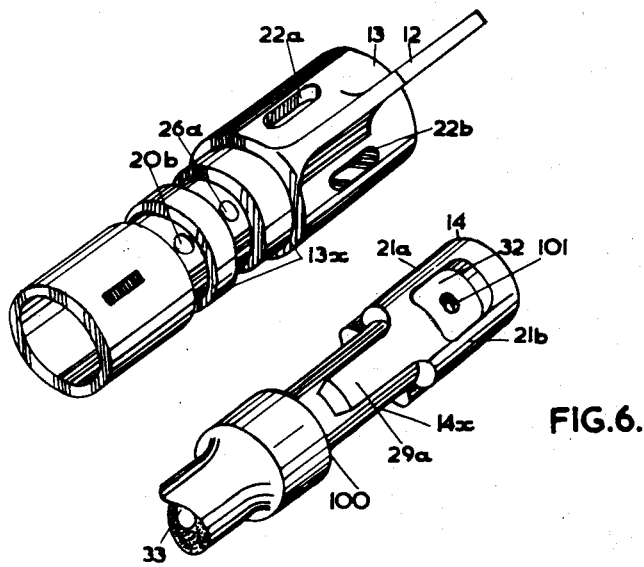
Figure 6 is a perspective view of the ported sleeve and rotary valve member of Figure 4 shown separated but with their coacting ports and lands aligned in the same radial planes they occupy when in assembled position.
Figure 7:
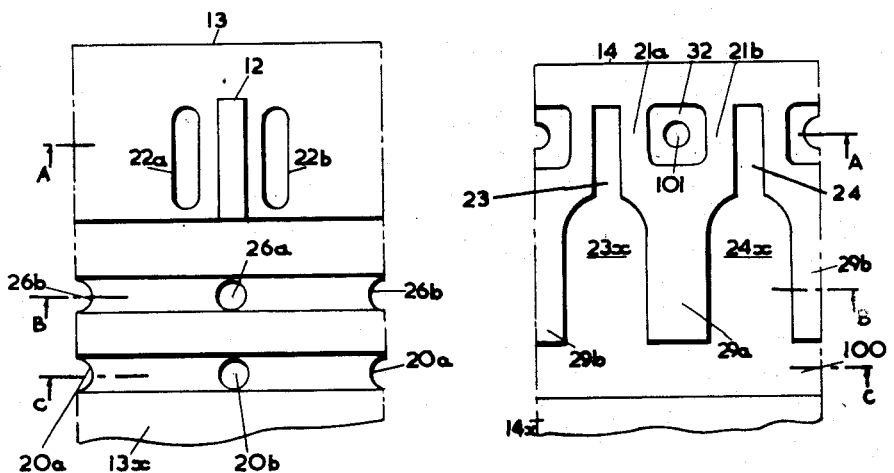
Figure 7 shows developments into the flat of the ported sleeve and rotary valve member in the same relative positions as shown in Figure 6.

In Figures 3 to 5 the throttle control lever 60 is connected, by a link 41, to the arm 42 which is keyed at 43 to the valve member 14, and the sleeve 13 is keyed at 200 to a member 45 having a cam slot 46 in which is engaged a roller 47 on a lever 70 mechanically connected to the control element 67 of the constant-speed mechanism for controlling the datum setting of the constant-speed mechanism. For effecting this connection the arm 70 is made fast with a shaft 201 which has a bearing in a wall 202 of the casing 19 and extends outwardly thereof. At its outer end the shaft 201 has fast with it a second arm 203 which is connected by a link 204 to one arm 205 of a bell-crank lever pivoted at 206 to a stationary member (not shown). The other arm 207 of the bell-crank lever is connected by a link 208 to one arm 209 of a second bell-crank lever pivoted at 210 to a stationary member (not shown) and the second arm 211 of this lever is connected by a link 212 to rock, about a pivot 213, a toothed quadrant 214 of the constant-speed mechanism.

Keyed at 215 to the valve member 14 is an arm 216 which is linked at 48 to a second arm 49 which carries a member 50 having a cam slot 51 for similarly adjusting the fuel valve by means of a roller 52 on the bell-crank lever 71 connected at 66 to the fuel valve, the arm 49 and member 50 being shown in Figure 3 as journalled on a pivot 53. Actually the bell-crank lever 71 comprises an arm 71a by which the roller 52 is carried and which is fast with a shaft 71b, journalled in the wall 202, also carrying an arm 71c to which latter the link 66 is connected.

For reverse movement of the pilot's throttle lever (i. e., to reduce the speed and power of the unit by reducing the fuel supply and lowering the datum setting of the constant-speed mechanism 68) the action above described is reversed, the hydraulic fluid then entering the compartment 11b, from the passages 24x, 24 and the associated ports 26b and 22b, and exhausting through the port 22a to the space 32.

Figure 5 shows the control element 67 of the constant speed mechanism acting, through a spring 217 and a governor 218, on a valve member 219 for controlling a hydraulic supply from a pump 220 to the pitch-changing mechanism (indicated at 221) of the propeller 222 of a gas turbine unit 223. In the position shown the lands 224 and 225 are respectively blocking supply lines 226 and 227 to opposite sides of a piston 228 of the pitch changing mechanism and thus hydraulically lock the latter. A relief valve 229 in these conditions by-passes the output of the pump 220 to a passage 230 leading to the pump intake. Movement of the valve member 219 downwardly in the figure directs the pump output through the line 227 to one side of the piston 228, and movement of the latter expresses the fluid on its opposite side through the line 226 and the passage 230 back to the pump intake. A reverse operation from the position shown of the valve member 219 reversely moves the piston 228 and the fluid is expressed through the line 227 and a further return passage 231 to the pump. As indicated, the piston 228, in known manner, has a rack 232 engaging toothed segments 233 fast with the propeller blades for varying the pitch.

What we claim as our invention and desire to secure by Letters Patent of the United States is:

1. In combination, a fluid pressure servomotor having a fixed element and a movable element with a working chamber between them, said movable servo element having a port through which motive fluid can be supplied to said working chamber, valve means which when rotated admits the motive fluid through said port to said working chamber to rotate said movable servo element to a new position in which said port is again closed by said valve means, said valve means having two portions angularly rotatable in unison, one of said portions having a land to coact with said port upon rotation of said portions normally to close it, a valve chamber adjacent said land from which motive fluid can be supplied through said port when said valve member is initially rotated, means for restricting the supply of such motive fluid whereby the response of said movable servo element will be a relatively-slow one, and said other portion of said valve means having a valve chamber connected with that first-mentioned, said valve chamber of said second portion being adjacent a land which co-operates with a port movable with said movable servo element for supplying motive fluid to said valve chamber and which overlaps said port to a greater extent than the land first-mentioned overlaps its associated port, whereby motive fluid will be delivered from said second-mentioned port to said working chamber only after the initial movement of said valve member to actuate said movable servo element at a greater speed, said second-mentioned port catching up and being screened by said second-mentioned land before said first-mentioned land catches up and screens said first-mentioned port, so that the final delivery of motive fluid to said working chamber will be at a relatively-low rate through said restricting means.

2. The combination of claim 1, with a constant-speed, variable-pitch propeller driven by an internal-combustion turbine unit, including a constant-speed mechanism controlling the pitch, said mechanism having a control element actuated by a cam which is in turn actuated by said movable servo element.

3. The combination of claim 1, with a constant-speed, variable-pitch propeller driven by an internal combustion turbine unit, including a constant-speed mechanism controlling the pitch, said mechanism having a control element actuated by said movable servo element.

4. In combination, a variable pitch propeller having a constant-speed mechanism and an internal combustion turbine unit driving said propeller, a throttle control for the turbine unit, a movable control element connected to the constant speed mechanism for varying the datum setting thereof, and a hydraulic time delay mechanism connecting said control element to said throttle control and having means actuated by the throttle control and connected to the control element for initially increasing the datum setting at a relatively low rate in response to a quick movement of the throttle control in increasing the supply of fuel to unit, and for subsequently increasing the datum setting at a relatively high rate and finally increasing the datum setting at a relatively low rate, so as to enable said turbine unit to rapidly assume the selected speed and power without undesirable fluctuations.

5. In combination, a variable pitch propeller having a constant-speed mechanism and an internal combustion turbine unit driving said propeller, a throttle control for the turbine unit, a movable control element connected to the constant speed mechanism for varying the datum setting thereof, and a hydraulic time delay mechanism connecting said control element to said throttle control and including a first member connected to and actuated by the throttle control and a second member movable relative to the first member and connected to the control element, said members being hydraulically coupled together for initially increasing the datum setting at a relatively low rate in response to a quick movement of the throttle control in increasing the supply of fuel to unit, and for subsequently increasing the datum setting at a relatively high rate and finally increasing the datum setting at a relatively low rate, so as to enable said turbine unit to rapidly assume the selected speed and power without undesirable fluctuations.

BRIAN H. SLATTER.
THOMAS G. DAISH.

REFERENCES CITED

The following references are of record in the file of this patent:

UNITED STATES PATENTS

| Number | Name | Date |
|---|---|---|
| 2,217,364 | Halford et al. | Oct. 8, 1940 |
| 2,384,353 | Stieglitz | Sept. 4, 1945 |
| 2,396,618 | Stieglitz et al. | Mar. 12, 1946 |
| 2,429,189 | Maddox | Oct. 14, 1947 |

FOREIGN PATENTS

| Number | Country | Date |
|---|---|---|
| 671,248 | France | Aug. 31, 1929 |